United States Patent

[11] 3,557,319

[72] Inventor Robert E. Maurer
North Andover, Mass.
[21] Appl. No. 807,022
[22] Filed Mar. 13, 1969
[45] Patented Jan. 19, 1971
[73] Assignee Bell Telephone Laboratories Incorporated
Murray Hill, N.J.
a corporation of New York

[54] SIGNALING GUARD CIRCUIT
10 Claims, 3 Drawing Figs.

[52] U.S. Cl. 179/84, 328/135
[51] Int. Cl. H04m 1/50
[50] Field of Search 179/84VF; 328/135

[56] References Cited
UNITED STATES PATENTS
3,229,041 1/1966 Drake et al. 179/84(VF)

*Primary Examiner*—Kathleen H. Claffy
*Assistant Examiner*—William A. Helvestine
*Attorneys*—R. J. Guenther and James Warren Falk

ABSTRACT: A control circuit in a single frequency signal receiver operates to separate the positive portions of an incoming signal from the negative portions thereof. The difference between the positive and negative portions is used to control the gating of the incoming signal or a separately generated signal.

INVENTOR
R.E MAURER
BY J S Cubert
ATTORNEY

SIGNALING GUARD CIRCUIT

BACKGROUND OF THE INVENTION

My invention is related to signaling arrangements and more particularly to circuits for obtaining control signals in inband signal receivers.

Voice communication systems wherein stations are selectively interconnected through a switching network generally require some form of signaling to transmit information to control network connections. Such signaling may be accomplished within the voice frequency band. This advantageously provides a method of testing the transmission path for voice signals and also uses the voice communications path for signaling.

An example of inband signaling well known in the art is single frequency signaling. In systems using this type of signaling, a single frequency tone may be used to convey control information via the voice path. Since voice signals may also contain the single frequency signaling tone, signaling receivers must be constructed so that they are responsive only to the tone signals but not to speech signals. Otherwise, speech signals containing the signaling tone may cause false operation of the control equipment associated with the receiver. In one type of prior known signaling receivers, the incoming signal is applied to two separate paths. One path includes a narrowband filter which passes only frequencies in the neighborhood of the specified tone signal. The other path includes a wideband filter which passes all voice frequency signals except those in the immediate neighborhood of the tone signal. The output of the wideband filter determines a speech guard signal. The outputs of the two paths are compared and a control signal is developed to disconnect a utilization device attached to the receiver if the ratio of the amplitude of the narrowband signal to the amplitude of the wideband signal is greater than a predetermined value.

Another method of developing a control signal related to guard action known in the art is based on a comparison of the time of occurrence of immediately successive zero crossings derived from incoming signals. The zero crossings are detected and pulses representing the zero crossings are delayed by a half period of the signaling tone frequency. The delayed zero crossing pulses are then compared to the immediately received zero crossing pulses from the incoming signal. In the event that coincidence does not occur, a guard signal is generated so that the voice signals present in the incoming signal may provide an appropriate control signal or are prevented from reaching the output of the signaling receiver. Because only the portion of the incoming signal in the neighborhood of the zero crossing is inspected, voice signals distinguishable from the signaling tone frequency but having the desired zero crossing property may be interpreted as signaling tones. Both these guard techniques are sensitive to noise appearing on the transmission path.

It is known from experimental evaluation that, unlike signaling tones, speech signals are characterized by a pronounced degree of envelope asymmetry. This asymmetry may be advantageously used to develop a guard signal to control the operation of a signaling receiver. The asymmetry technique is relatively insensitive to noise which produces both the signaling tone frequency and other inband frequencies.

SUMMARY OF THE INVENTION

My invention is a circuit in a signaling receiver in which a circuit controls a signal gate so that only signaling tones are permitted to enable the gate. An incoming signal is applied to the circuit wherein the positive portions and the negative portions of the incoming signal are separated. The separated signals are applied to a comparator circuit which compares a first signal produced in response to the envelope of the positive portions with a second signal produced in response to the envelope of the negative portions. Speech signals, characterized by envelope asymmetry, cause the comparator circuit to generate a control gate inhibit signal.

According to one aspect of my invention, a signal generated in the receiver is applied to the signal gate which gate is controlled by the output from the comparator circuit.

According to another aspect of my invention, the incoming signal is applied to the signal gate which gate is controlled by the comparator circuit output to pass signaling tones and to inhibit speech signals.

DETAILED DESCRIPTION

Figure 1:
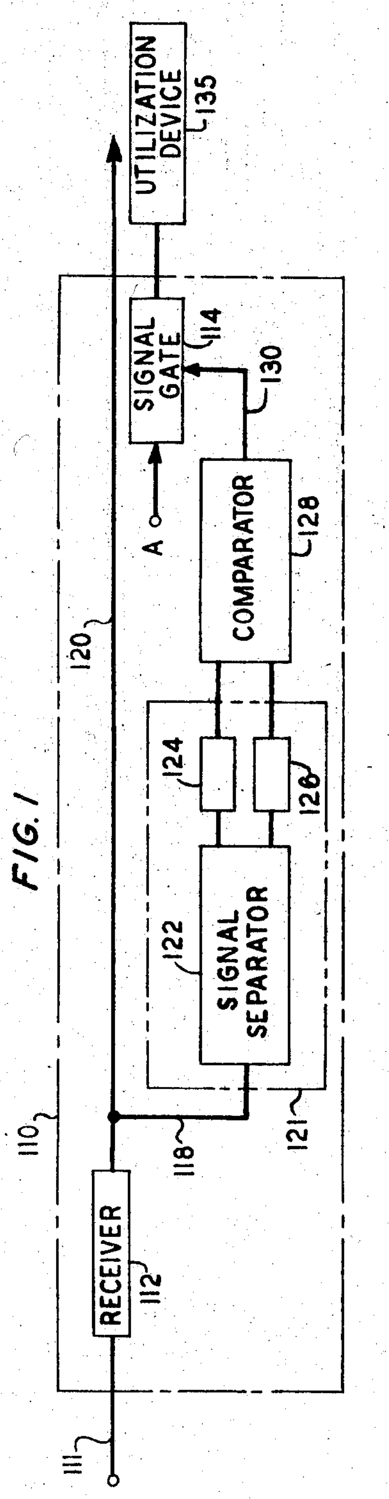
FIG. 1 depicts a block diagram of a signal receiver, including an embodiment of the invention, wherein a signal generated in the receiver is applied to the signal gate.

FIG. 1 shows a signaling receiver in which the asymmetrical characteristics of speech signals and the symmetrical characteristics of signaling tones are used to control a utilization device connected thereto. An incoming signal is applied to receiver 110 via path 111. The incoming signal is applied to receiver circuit 112. Circuit 112 may comprise filters, amplifiers, and detector circuits which operate to convert the incoming signal to a form acceptable to devices connected to line 120. Signal gate 114 is arranged to pass a separately generated signal A when only signaling tones are present in the incoming signal and to inhibit gate 114 when speech signals are present in the incoming signal. The control signal output of gate 114 is transmitted therefrom to utilization device 135. The separately generated signal may be a DC voltage or other appropriate signal form known in the art. It may also be derived from the incoming signal.

The incoming signal from circuit 112 is also applied to circuit 121 which develops one signal corresponding to the positive portion of the incoming signal and another signal corresponding to the negative portion of the incoming signal. Circuit 121, in this embodiment, comprises separator circuit 122 and circuits 124 and 126. The separator employs voltage discriminating devices such as diodes or transistors to separate the positive portion of the incoming signal from the negative portion thereof. The positive portion detected in separator 122 is applied to circuit 124 which converts the positive portion to a voltage corresponding to the envelope of said positive portions. Circuit 126 performs the same function on the negative portions detected in separator 122 and its output corresponds to the envelope of the negative portions. Circuits 124 and 126 may also be arranged to provide outputs corresponding to the peak positive and negative signal portions, respectively. The outputs of circuits 124 and 126 are further applied to comparator 128 which is responsive to any difference between the signals from circuits 124 and 126 to produce a gating signal which is transmitted to signal gate 114 via lead 130. The comparator may also comprise a difference circuit responsive to a predetermined difference between the signals from circuits 124 and 126.

If the incoming signal is a signaling tone such as a 2600 hertz tone, the envelope of the positive portions appearing at the output of circuit 124 is equal in magnitude to the envelope of the negative portions appearing at the output of circuit 126. In this event comparator 128 is operative to apply a permissive signal to gate 114 so that signal A is permitted to pass through gate 114 to utilization device 135. It should be noted that noise signals within the speech band are generally symmetrical so that the circuit is not responsive thereto.

If the incoming signal contains speech, the envelope of the positive portions at the output of circuit 124 is not equal in amplitude to the envelope of the negative portions at the output of circuit 126. This is so because speech signals are characteristically asymmetrical. Thus, there is a difference in the magnitude of the signal from circuit 124 and the signal from circuit 126. This difference is detected in comparator 128 which operates in response thereto to provide an inhibiting signal to gate 114. Gate 114 then blocks signal A so that utilization device 135 is unaffected as a result of an incoming signal containing speech signal components. Where both speech and tone signals are contained in the incoming signal, other control signals may be generated as is well known in the art to control gate 114 in conjunction with the signal on lead 130.

Figure 2:
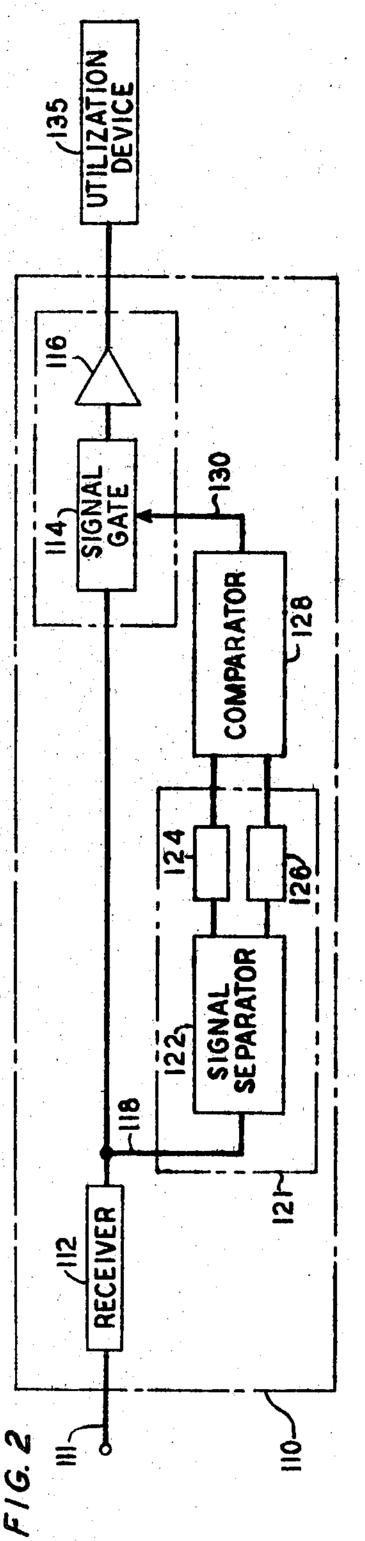
FIG. 2 depicts a block diagram of a signal receiver, including an embodiment of the invention, wherein the incoming signal is applied to the signal gate.

FIG. 2 shows another block diagram of a signaling receiver which is substantially similar to FIG. 1 except that lead 120 provides a path from receiver circuit 112 to the input of gate 114. Gate 114 in FIG. 2 operates to pass incoming signals or modified incoming signals containing only signaling tones to utilization device 135 via amplifier 116. The output of comparator 128 is applied to gate 114 as in FIG. 1 but operates to open the gate only when signaling tones are detected by the arrangement including circuit 121 and comparator 128. In this way receiver 110 is operative to transmit only signaling tones to utilization device 135.

Figure 3:
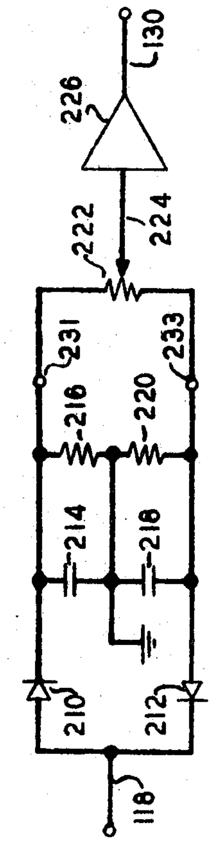
FIG. 3 shows a schematic diagram of a circuit useful in providing the control signal in the block diagram of FIGS. 1 and 2.

The circuit of FIG. 3 performs the functions of signal separator 122, circuits 124 and 126, and comparator 128. Referring to FIG. 3, the incoming signal is applied to the anode of diode 210 and the cathode of diode 212. Diode 210 operates to detect the positive portions of the incoming signal and diode 212 is operative to detect the negative portions of the incoming signal. When the incoming signal is positive, diode 210 is rendered conductive so that current flows through diode 210 and the filter circuit comprising the parallel combination of resistor 216 and capacitor 214 to ground. Capacitor 214 and resistor 216 may be selected so that the envelope of the positive portions appears at point 231 and the higher frequency components are eliminated.

Diode 212 is connected to conduct only when the incoming signal is negative. This permits current to flow from ground through the parallel combination of resistor 220 and capacitor 218 and diode 212 so that only the envelope of the negative portions appears at point 233. The difference in voltage between points 231 and 233 is applied to potentiometer 222 which may be initially adjusted to provide a zero voltage on lead 224 when the voltages at points 231 and 233 are equal and opposite. If, however, there is a difference in magnitude between the voltages on points 231 and 233, a voltage other than zero appears on lead 224. This nonzero voltage is amplified in amplifier 226 which produces an inhibiting signal in response thereto. Thus, the application of a voice signal characterized by envelope asymmetry results in an inhibiting signal on lead 130.

I claim:

1. In a receiver having a signal gate, a circuit for controlling the signal gate comprising means for separating the positive portion of an incoming signal from the negative portion of said incoming signal, means connected to said separating means responsive to the positive portion for producing a first signal, means connected to said separating means responsive to the negative portion for producing a second signal, and means responsive to the difference between said first and second signals for selectively applying a control signal to said signal gate.

2. In a receiver having an incoming signal gate, a circuit for controlling the signal gate according to claim 1 wherein said first signal producing means comprises first filtering means for developing a signal proportional to the envelope of said positive portions, and said second signal producing means comprises second filtering means for developing a signal proportional to the envelope of said negative portions.

3. In a receiver having a signal gate, a circuit for controlling said signal gate according to claim 2 wherein said control signal applying means comprises means for detecting differences between the outputs of said first and second filtering means, and means operative in response to said detected difference for generating a gate inhibiting signal.

4. In a receiver having a signal gate, a circuit for controlling the signal gate according to claim 2 wherein said first signal producing means comprises means for generating a signal proportional to the peak of said positive portion and said second signal producing means comprises means for generating a signal proportional to the peak of said negative portion.

5. In a receiver having a signal gate, a circuit for controlling the signal gate according to claim 4 wherein said control signal applying means comprises means for detecting the difference between the amplitude of said positive portion peak signal and the amplitude of said negative portion peak signal, and means operative in response to the peak signal difference for generating a signal to inhibit the signal gate.

6. In a signaling receiver having an incoming signal gate for passing only tone signals, a gate control circuit comprising means responsive to an incoming signal applied to said receiver for producing a first signal proportional to the positive portion of said incoming signal and for producing a second signal proportional to the negative portion of said incoming signal, means for comparing said first and second signals, and means responsive to the operation of said comparing means for generating a gate control signal.

7. In a signaling receiver having means for selectively gating an incoming signal, a gate control circuit comprising means for detecting the degree of asymmetry in said incoming signal including means for generating a first signal corresponding to the incoming signal positive portion and for generating a second signal corresponding to the incoming signal negative portion, means for comparing said first and second signals, and means responsive to a predetermined difference between said first and second signals for applying an inhibit signal to said gating means.

8. In a speech band signaling tone receiver having a gate for passing only incoming tone signals, a guard circuit comprising means responsive to an incoming signal for detecting the positive portion of said incoming signal, means responsive to said incoming signal for detecting the negative portion of said incoming signal, means responsive to the detected positive portion for producing a first signal proportional to the envelope of the detected positive portion, means responsive to the detected negative portion for producing a second signal proportional to the envelope of the detected negative portion, and means jointly responsive to said first and second signals for applying a control signal to said gate.

9. In a speech band signaling tone receiver having a gate for passing only incoming tone signals, a guard circuit according to claim 8 wherein said control signal applying means comprises an impedance network having first, second and third terminals, means for applying said first signal to said first terminal, means for applying said second signal to said second terminal, and means connected to said third terminal for comparing said first and second signals, and means connected to said third terminal responsive to any difference between said first and second signals appearing on said third terminal for generating a signal to inhibit said gate.

10. A speech band signaling receiver having a circuit for distinguishing between speech signals and signaling tones comprising means responsive to receipt of an incoming signal for detecting the envelope of the positive portion of said incoming signal, means responsive to receipt of said incoming signal for detecting the envelope of the negative portion of said incoming signal, and means responsive to a predetermined difference between said detected positive and negative envelopes for generating a control signal whereby a first type control signal is generated in response to an incoming signal containing speech signals and a second kind of control signal is generated in response to an incoming signal containing only signaling tones.